UNITED STATES PATENT OFFICE.

DAVID RUSSELL GREENE, OF CHICAGO, ILLINOIS.

CONDIMENT FOR WELSH RABBITS.

999,217. Specification of Letters Patent. Patented Aug. 1, 1911.

No Drawing. Application filed April 9, 1906. Serial No. 310,847.

*To all whom it may concern:*

Be it known that I, DAVID RUSSELL GREENE, a citizen of the United States, and a resident of Chicago, Cook county, Illinois, have invented a certain new and useful Composition of Matter, entitled "Condiments for Welsh Rabbits," of which the following is a full, clear, and exact description, such as will enable others skilled in the art to which it appertains to make and use the same.

My invention relates to condiments for Welsh rabbits and the object of my invention is to provide a substance wherein the necessary condimental ingredients of a Welsh rabbit shall be combined in proper and convenient form. The excellence of a Welsh rabbit is dependent upon the proportions of the condimental ingredients that are used in making the same and the special purpose of this invention is to provide the requisite condiments in exactly the right proportions, ready for use so that any person whether or no he is skilled in such cookery may with ease prepare a Welsh rabbit in accordance with an approved recipe and the best practice.

My invention consists in a new composition of matter, *i. e.*, a condimental substance to be combined with the nutritive ingredients of a Welsh rabbit, and which comprises a substantially dry substance in either granular or tablet form, composed of salt, mustard, red pepper, desiccated egg, and paprika.

The specific proportions, in volume preferably used in carrying out my invention, are as follows, to-wit: Salt, 2½ parts—mustard, 15 parts—red pepper, 2½ parts, paprika, 2½ parts and desiccated egg, 23 parts. The condiments and the desiccated egg are employed in pulverulent form and are thoroughly admixed while dry. The mixture is then wetted with water, enough being used to form the mixture into a thick, pasty mass. The mass is then dried and after being dried is broken down or granulated into convenient form for use. The ingredients are thus caused to combine or unite and form a single substance, which supplies or contains all of the condiments necessary to the preparation of a rabbit.

While my novel composition of matter could be sold, shipped and used in the solid mass into which it is first formed or dried, still it is not very convenient to handle it in this form. I therefore break it down or granulate it both for convenience in packing and shipping and for the purpose of measuring out proportions for use.

The granulated material may be packed in bottles, cans or jars, but I prefer to form it into small tablets for the purpose of assisting the cook in determining the proper portion of the material to use, each tablet being of a size to contain sufficient of the material for a rabbit of usual size.

In using my novel condimental substance in making a rabbit, the tablet is first dissolved in water and in that form is added to the other ingredients.

Having thus described my invention, I claim as new, and desire to secure by Letters Patent:

1. As a new article of manufacture, condimental matter in granular form, for use in making Welsh rabbit, each granule thereof being composed of pulverulent salt, mustard, red pepper, desiccated egg and paprika, in substantially the proportions stated, the ingredients being formed into granules in substantially the manner described.

2. As a new article of manufacture, a soluble tablet of condimental matter composed of a mass of granules compressed into tablet form, each granule thereof being formed in the manner described and being composed of pulverulent salt, mustard, red pepper, desiccated egg and paprika, in substantially the proportions stated.

In testimony whereof, I have hereunto set my hand this 2nd day of April, 1906, in the presence of two subscribing witnesses.

DAVID RUSSELL GREENE.

Witnesses:
M. SIMON,
JOHN R. LEFEVRE.

Copies of this patent may be obtained for five cents each, by addressing the "Commissioner of Patents, Washington, D. C."